United States Patent
Heikes et al.

(10) Patent No.: US 8,775,539 B2
(45) Date of Patent: *Jul. 8, 2014

(54) CHANGING EVENT NOTIFICATION VOLUMES

(75) Inventors: Brian D. Heikes, Ashburn, VA (US);
Xiaoyan Yin, Fairfax Station, VA (US);
Deborah R. Yurow, Arlington, VA (US);
Kelly Matthews, Bristow, VA (US);
Barry Appelman, McLean, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,967

(22) Filed: Sep. 15, 2012

(65) Prior Publication Data

US 2013/0067499 A1 Mar. 14, 2013

Related U.S. Application Data

(63) Continuation of application No. 12/693,282, filed on Jan. 25, 2010, now Pat. No. 8,554,849, which is a continuation of application No. 10/744,080, filed on Dec. 24, 2003, now Pat. No. 7,769,811.

(60) Provisional application No. 60/450,674, filed on Mar. 3, 2003.

(51) Int. Cl.
*G06F 15/16* (2006.01)
*G06Q 10/10* (2012.01)
*H04M 19/04* (2006.01)

(52) U.S. Cl.
CPC ............. *G06Q 10/107* (2013.01); *H04M 19/04* (2013.01)
USPC .......................................................... 709/206

(58) Field of Classification Search
CPC .................................................. G06Q 10/107

USPC ......................................................... 709/206
See application file for complete search history.

(56) References Cited

U.S. PATENT DOCUMENTS 5,742,905 A 4/1998 Pepe et al.
5,793,365 A 8/1998 Tang et al.
(Continued)

FOREIGN PATENT DOCUMENTS

EP 1274222 1/2003
WO 03005685 1/2003
(Continued)

OTHER PUBLICATIONS

"Mac OS X in the Open: View topics—Adium history," [online], [retrieved on Dec. 14, 2004]. http://forums.cocaforge.com/viewtopic.php?t=168&highligh=history.

(Continued)

*Primary Examiner* — Shaq Taha
(74) *Attorney, Agent, or Firm* — Keller Jolley Preece

(57) ABSTRACT

Controlling the volume of an audible alert associated with an instant messaging communications session includes rendering, on a first instant messaging user system, an instant messaging application user interface for an instant messaging communications session involving at least a first instant messaging user and a second instant messaging user, receiving notification of an event related to the instant messaging communications session, determining a characteristic of the event, accessing an audible alert to be rendered to signal existence of the event, adjusting based upon the determined characteristic of the event a volume of the audible alert corresponding to the event, and rendering the audible alert to signal existence of the event.

24 Claims, 7 Drawing Sheets

(56) References Cited

U.S. PATENT DOCUMENTS

| | | | |
|---|---|---|---|
| 5,802,467 A | 9/1998 | Salazar et al. |
| 5,828,312 A | 10/1998 | Yamazaki |
| 5,872,521 A | 2/1999 | Lopatukin et al. |
| 5,960,173 A | 9/1999 | Tang et al. |
| 6,211,795 B1* | 4/2001 | Izuta ........................... 340/7.52 |
| 6,212,548 B1 | 4/2001 | DeSimone et al. |
| 6,260,148 B1 | 7/2001 | Aggarwal et al. |
| 6,301,609 B1 | 10/2001 | Aravamudan et al. |
| 6,324,492 B1 | 11/2001 | Rowe |
| 6,346,952 B1 | 2/2002 | Shtivelman |
| 6,366,962 B1 | 4/2002 | Teibel |
| 6,389,127 B1 | 5/2002 | Vardi et al. |
| 6,405,035 B1 | 6/2002 | Singh |
| 6,449,344 B1 | 9/2002 | Goldfinger et al. |
| 6,453,294 B1 | 9/2002 | Dutta et al. |
| 6,505,167 B1 | 1/2003 | Horvitz et al. |
| 6,519,639 B1 | 2/2003 | Glasser et al. |
| 6,539,421 B1 | 3/2003 | Appelman et al. |
| 6,549,937 B1 | 4/2003 | Auerbach et al. |
| 6,564,261 B1 | 5/2003 | Gudjonsson et al. |
| 6,604,133 B2 | 8/2003 | Aggarwal et al. |
| 6,631,412 B1 | 10/2003 | Glasser et al. |
| 6,654,790 B2 | 11/2003 | Ogle et al. |
| 6,658,095 B1 | 12/2003 | Yoakum et al. |
| 6,668,167 B2 | 12/2003 | McDowell et al. |
| 6,677,968 B1 | 1/2004 | Appleman et al. |
| 6,691,162 B1 | 2/2004 | Wick |
| 6,701,345 B1 | 3/2004 | Carley et al. |
| 6,714,519 B2 | 3/2004 | Luzzatti et al. |
| 6,714,793 B1 | 3/2004 | Carey et al. |
| 6,728,357 B2 | 4/2004 | O'Neal et al. |
| 6,750,881 B1 | 6/2004 | Appelman |
| 6,760,580 B2 | 7/2004 | Robinson et al. |
| 6,791,583 B2 | 9/2004 | Tang et al. |
| 6,807,562 B1 | 10/2004 | Pennock et al. |
| 6,829,582 B1 | 12/2004 | Barsness |
| 6,865,268 B1 | 3/2005 | Matthews et al. |
| 6,876,728 B2 | 4/2005 | Kredo et al. |
| 6,914,519 B2 | 7/2005 | Beyda |
| 7,016,978 B2 | 3/2006 | Malik et al. |
| 7,127,685 B2 | 10/2006 | Canfield et al. |
| 7,281,215 B1 | 10/2007 | Canfield et al. |
| 7,328,242 B1 | 2/2008 | McCarthy et al. |
| 7,356,567 B2 | 4/2008 | Odell et al. |
| 7,769,811 B2 | 8/2010 | Heikes et al. |
| 8,086,672 B2* | 12/2011 | Horvitz ........................... 709/206 |
| 2001/0013050 A1 | 8/2001 | Shah |
| 2001/0013069 A1 | 8/2001 | Shah |
| 2001/0027474 A1 | 10/2001 | Nachman et al. |
| 2001/0034224 A1 | 10/2001 | McDowell et al. |
| 2001/0034622 A1 | 10/2001 | Davis |
| 2002/0007398 A1 | 1/2002 | Mendiola et al. |
| 2002/0023131 A1 | 2/2002 | Wu et al. |
| 2002/0026483 A1 | 2/2002 | Ilaacs et al. |
| 2002/0026520 A1 | 2/2002 | Mendiola et al. |
| 2002/0034281 A1* | 3/2002 | Isaacs et al. ............... 379/88.12 |
| 2002/0035605 A1 | 3/2002 | McDowell et al. |
| 2002/0046299 A1 | 4/2002 | Lefeber et al. |
| 2002/0062345 A1 | 5/2002 | Guedalia et al. |
| 2002/0065894 A1 | 5/2002 | Dalal et al. |
| 2002/0087704 A1 | 7/2002 | Chesnais et al. |
| 2002/0116461 A1 | 8/2002 | Diacakis et al. |
| 2002/0116541 A1 | 8/2002 | Parker et al. |
| 2002/0120687 A1 | 8/2002 | Diacakis et al. |
| 2002/0120697 A1 | 8/2002 | Generous et al. |
| 2002/0129103 A1 | 9/2002 | Birkler et al. |
| 2002/0130904 A1 | 9/2002 | Becker et al. |
| 2002/0178161 A1 | 11/2002 | Brezin et al. |
| 2003/0037103 A1 | 2/2003 | Salmi et al. |
| 2003/0055977 A1 | 3/2003 | Miller |
| 2003/0088621 A1 | 5/2003 | Martinez et al. |
| 2003/0088705 A1* | 5/2003 | Katagishi et al. ............ 709/246 |
| 2003/0101343 A1 | 5/2003 | Eaton et al. |
| 2003/0158864 A1 | 8/2003 | Samn |
| 2003/0162561 A1 | 8/2003 | Johnson et al. |
| 2003/0167172 A1 | 9/2003 | Johnson et al. |
| 2003/0179230 A1 | 9/2003 | Seldman |
| 2003/0208545 A1 | 11/2003 | Eaton et al. |
| 2003/0217109 A1 | 11/2003 | Ordille et al. |
| 2003/0229722 A1 | 12/2003 | Beyda |
| 2004/0001086 A1 | 1/2004 | Brown et al. |
| 2004/0019695 A1 | 1/2004 | Fellenstein et al. |
| 2004/0030750 A1 | 2/2004 | Moore et al. |
| 2004/0054737 A1 | 3/2004 | Daniell |
| 2004/0056893 A1 | 3/2004 | Canfield et al. |
| 2004/0059781 A1 | 3/2004 | Yoakum et al. |
| 2004/0068567 A1 | 4/2004 | Moran et al. |
| 2004/0073643 A1 | 4/2004 | Hayes et al. |
| 2004/0078445 A1 | 4/2004 | Malik |
| 2004/0111479 A1 | 6/2004 | Borden et al. |
| 2004/0128353 A1 | 7/2004 | Goodman et al. |
| 2004/0148346 A1 | 7/2004 | Weaver et al. |
| 2004/0158608 A1 | 8/2004 | Friedman |
| 2004/0158609 A1 | 8/2004 | Daniell et al. |
| 2004/0179039 A1 | 9/2004 | Blattner et al. |
| 2004/0203695 A1 | 10/2004 | Mikan |
| 2004/0223455 A1 | 11/2004 | Fong et al. |
| 2004/0224772 A1 | 11/2004 | Canessa et al. |
| 2004/0260753 A1 | 12/2004 | Regan |
| 2005/0066365 A1 | 3/2005 | Rambo |
| 2005/0069099 A1 | 3/2005 | Kozdon et al. |
| 2005/0102365 A1 | 5/2005 | Moore et al. |
| 2005/0149620 A1 | 7/2005 | Kirkland et al. |
| 2005/0210394 A1 | 9/2005 | Crandall et al. |
| 2006/0031292 A1 | 2/2006 | Deshpande |
| 2006/0034430 A1 | 2/2006 | Liakis |
| 2006/0059024 A1 | 3/2006 | Bailey et al. |
| 2006/0059240 A1 | 3/2006 | Qin et al. |
| 2010/0219937 A1 | 9/2010 | Heikes et al. |
| 2013/0067499 A1 | 3/2013 | Heikes et al. |

FOREIGN PATENT DOCUMENTS

| | | |
|---|---|---|
| WO | 2004079310 | 9/2004 |
| WO | 2006074040 | 7/2006 |
| WO | 2007047246 | 4/2007 |

OTHER PUBLICATIONS

"Adium X: Version History," [onlin], [retrieved on Dec. 14, 2004]. http://www.adiumx.com/history.html.

"Gaim: The Pimpin' Penguin IM Client that's good for the soul!" [online], [retrieved on Dec. 14, 2004]. http://gaim.sourceforge.net/ChangeLog.

International Search Report as received in International Application No. PCT/US2006/039504 dated May 16, 2007.

International Search Report as received in International Application No. PCT/US2004/06177 dated Jan. 31, 2005.

International Search Report as received in International Application No. PCT/US2005/047358 dated Feb. 9, 2007.

International Search Report as received in International Application No. PCT/US2005/047358 dated Jun. 13, 2007.

U.S. Appl. No. 10/744,080, Aug. 20, 2007, Office Action.
U.S. Appl. No. 10/744,080, Feb. 12, 2008, Office Action.
U.S. Appl. No. 10/744,080, May 23, 2008, Office Action.
U.S. Appl. No. 10/744,080, Aug. 4, 2008, Office Action.
U.S. Appl. No. 10/744,080, Mar. 6, 2009, Office Action.
U.S. Appl. No. 10/744,080, Sep. 29, 2009, Notice of Allowance.
U.S. Appl. No. 10/927,091, Apr. 4, 2008, Office Action.
U.S. Appl. No. 10/927,091, Oct. 17, 2008, Office Action.
U.S. Appl. No. 10/927,091, Apr. 15, 2009, Office Action.
U.S. Appl. No. 11/025,849, Jan. 18, 2007, Office Action.
U.S. Appl. No. 11/025,849, May 1, 2007, Office Action.
U.S. Appl. No. 11/025,849, Oct. 16, 2007, Notice of Allowance.
U.S. Appl. No. 12/693,282, Mar. 5, 2013, Office Action.
U.S. Appl. No. 13/620,966, Mar. 14, 2013, Office Action.
U.S. Appl. No. 12/693,282, Jul. 19, 2013, Notice of Allowance.
U.S. Appl. No. 13/620,966, Sep. 12, 2013, Office Action.

* cited by examiner

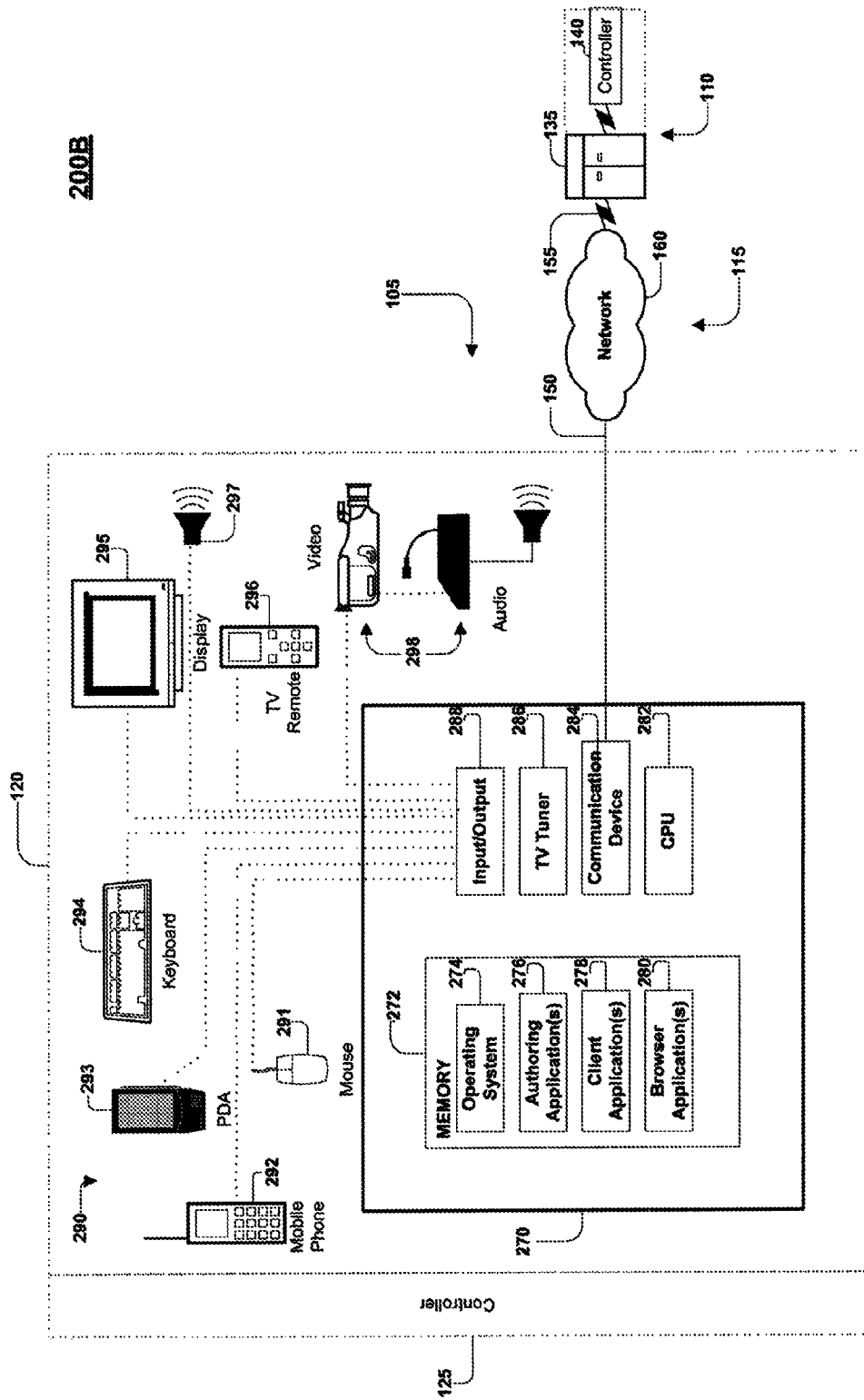

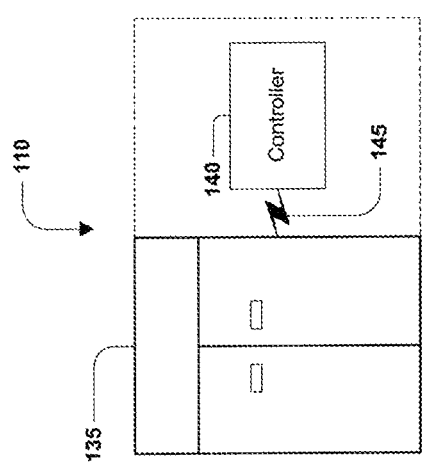

CHANGING EVENT NOTIFICATION VOLUMES

CROSS REFERENCE TO RELATED APPLICATIONS

This application is a continuation of U.S. application Ser. No. 12/693,282 filed on Jan. 25, 2010, which is a continuation of U.S. application Ser. No. 10/744,080 filed on Dec. 24, 2003 and issued as U.S. Pat. No. 7,769,881, which claims the benefit of U.S. Provisional Application Ser. No. 60/450,674 filed on Mar. 3, 2003, each of which are hereby incorporated by reference in their entirety.

TECHNICAL FIELD

This description relates to instant messaging and more particularly to instant messaging sound control.

BACKGROUND

During an instant messaging conversation, an audible alert may be played upon the receipt of an instant message, the sending of an instant message, or upon the occurrence of other events such as a designated user ("buddy") logging on or logging off of the instant messaging network. The audible alerts received during an instant messaging session to indicate the existence of different events may be customized and distinguished from each other. For instance, the sound played with respect to a user logging in may differ from the sound played with respect to the same user logging out.

SUMMARY

In one general aspect, controlling the volume of an audible alert associated with an instant messaging communications session includes rendering, on a first instant messaging user system, an instant messaging application user interface for an instant messaging communications session involving at least a first instant messaging user and a second instant messaging user. Controlling the volume also includes receiving notification of an event related to the instant messaging communications session, determining a characteristic of the event, accessing an audible alert to be rendered to signal existence of the event, adjusting based upon the determined characteristic of the event a volume of the audible alert corresponding to the event, and rendering the audible alert to signal existence of the event.

Implementations may include one or more of the following features. For example, adjusting the volume may include selecting among several volume levels available for rendering a single audible alert. The event may include receipt of an instant message from a second instant messaging user and the audible alert may correspond to a sound played to notify the first instant messaging user of the instant message.

The characteristic of the event may be determined by determining whether the event is an initial event, and the volume may be adjusted to an initial volume when the event is determined to be an initial event. The event may include, for example, the receipt of an instant message from an instant message sender. In one implementation, the identity of the instant message sender may be compared with the identity of a participant in an active instant messaging session to determine whether the event is an initial event. An active instant messaging session may include an instant messaging session having an open window and/or an instant messaging session in which an instant message was sent within a predetermined window of time.

Determining the characteristic of the event may include determining whether the event is a subsequent event related to a previous initial event, and the volume may be adjusted to an alternative volume that differs from the initial volume when the event is determined to be a subsequent event. The initial volume may be full volume and the alternative volume may be a volume less than the full volume such as, for example, a volume that is one-half or one-quarter of the full volume, or a volume that is barely audible. The alternative volume and the initial volume may be user-selected. The initial and alternative volumes may each be audible.

Determining the characteristic of the event may include determining whether the event is a subsequent event that follows an initial, related event. In the case that the event is a subsequent event, the volume may be adjusted to a subsequent volume (e.g., an alternative volume) that differs from the initial volume played for the initial event. The event may include receipt of an instant message from an instant message sender. Determining whether the event is a subsequent event may include comparing the identity of the instant message sender with the identity of a participant in an active instant messaging session. An active instant messaging session may include an instant messaging session having an open window and/or an instant messaging session in which an instant message was sent within a predetermined window of time.

In the case that the event is a subsequent event, a determination may be made as to whether the subsequent event has an event type that is the same as an event type of the initial event. The event type may include receipt of an instant message from an instant messaging sender and sending an instant message to the instant messaging sender. In the case that the subsequent event has a different event type than the event type of the initial event, the volume may be adjust to a volume based on and corresponding to the different event type. The subsequent volume may be a volume reduced from the initial volume.

Determining the characteristic of the event may include determining if the event is an event occurring after a lapse condition in an instant messaging conversation. In the case that the event occurs after a lapse condition, the volume may be adjusted to a lapse volume. The lapse volume may be, for example, the initial volume or a volume differing from a subsequent volume corresponding to a subsequent event.

A lapse condition may include the closing of an instant messaging communications window, logging out by a participant in an instant messaging communications session, an idle state of a participant in an instant messaging communications session, an away state of a participant in an instant messaging communications session, an absence of a user activity for a predetermined period of time, passage of a predetermined amount of time, such as five minutes, from message activity or a message in an instant messaging communications session, and a frequency of messaging activity in an instant messaging communications session that is less than a threshold frequency. A determination may be made as to whether a lapse condition has occurred.

The instant messaging communication session may include a text messaging session, a video messaging session and an audio messaging session.

In another general aspect, controlling the volume of an audible alert during an instant messaging communications session includes rendering, on a first instant messaging user system, an instant messaging application user interface for an instant messaging communications session involving at least a first instant messaging user and a second instant messaging user. Controlling the volume includes receiving a message from the second instant messaging user system over an instant messaging network, determining a characteristic of the message, and adjusting the volume of an audible alert to be played in response to receipt of the message based upon the determined characteristic of the message.

Implementations may include one or more of the following features. For example, determining the characteristic of the message includes determining if the message is an initial message in an instant messaging conversation and adjusting the volume may include adjusting the volume to an initial volume. Determining the characteristic of the message also may include determining if the message is a subsequent message after an initial message, and adjusting the volume may include adjusting the volume to a volume reduced from an initial volume. Determining the characteristic of the message may also include determining if the message is an initial message after a lapse in an instant messaging conversation, and adjusting the volume may include adjusting the volume to an initial volume. Determining the characteristic of the message also includes determining if the message is an initial message after a lapse in an instant messaging conversation, and adjusting the volume includes adjusting the volume to a volume between an initial volume and a reduced volume.

Aspects of the instant messaging sound control may be implemented by an apparatus and/or by a computer program stored on a computer readable medium. The computer readable medium may include a disc, a client device, a host device, and/or a propagated signal. In addition, aspects of the instant messaging sound control may be implemented in a client/host context or in a standalone or offline client device.

The described IM sound control avoids undesirably maintaining the same volume level, and it also enables other means by which information may be communicated. In contexts where users specify different sounds to identify events of different types or different identities for different users with whom they communicate, it can be useful to use volume differences to distinguish between initial and subsequent communications rather than confusing a recipient or replicating their interface with other different audible identifiers.

Other features will be apparent from the following description, including the drawings, and from the claims.

DESCRIPTION OF DRAWINGS

FIGS. 1, 2A, 2B, 3A and 3B are block diagrams of an exemplary communications system.

Figure 1:
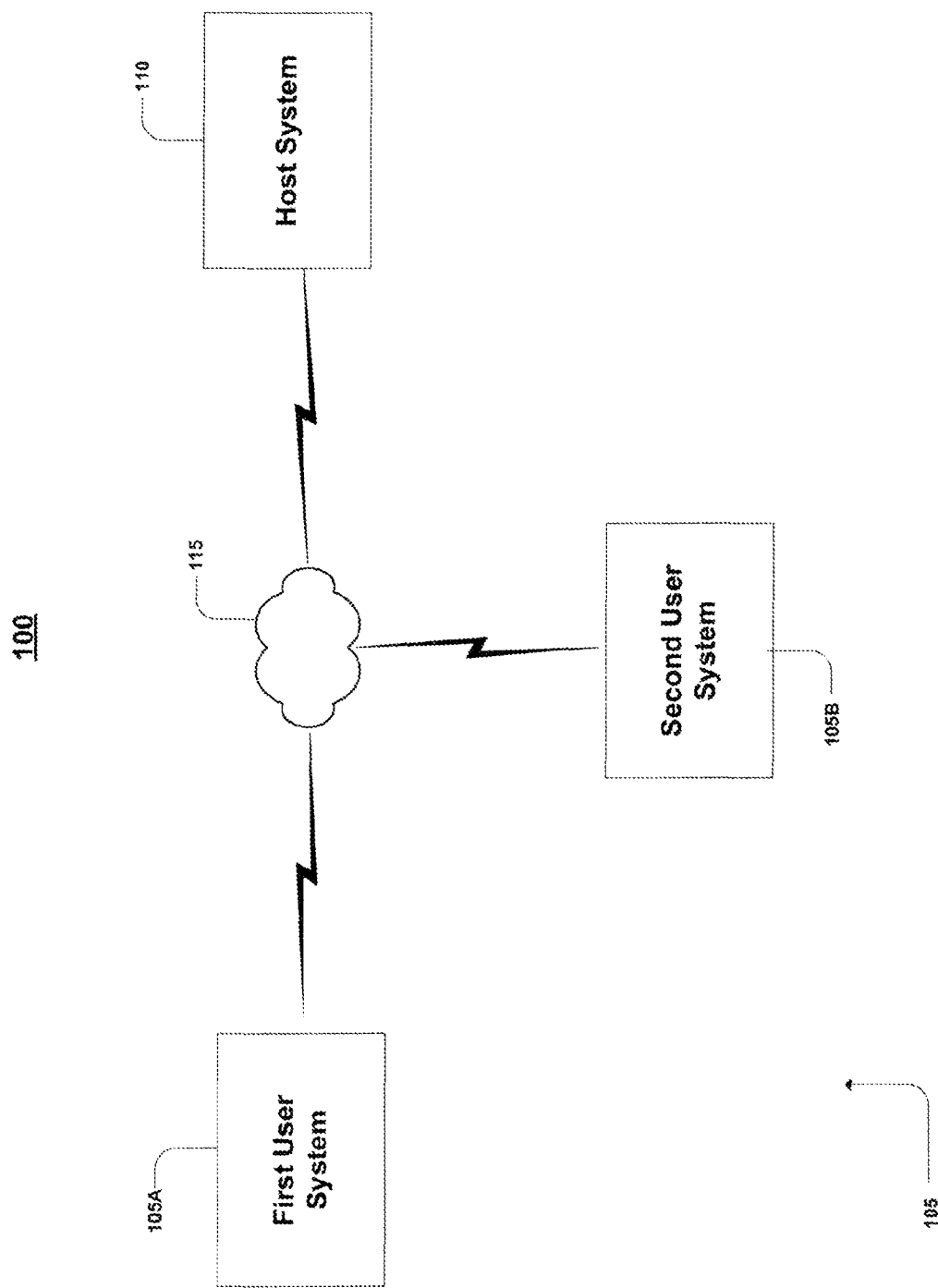

For brevity, several elements in the figures described below are represented as monolithic entities. However, as would be understood by one skilled in the art, these elements each may include numerous interconnected computers and components designed to perform a set of specified operations and/or may be dedicated to a particular geographic region.

DETAILED DESCRIPTION

Techniques are described for controlling the volume of sounds played during an instant messaging session. For example, the initial sound played in response to the occurrence of an initial event in an instant messaging session is played at an initial volume, such as full volume. Subsequent sounds played in response to the occurrence of subsequent events in the same instant messaging session are played at a subsequent volume, such as a reduced volume, which is distinguished from the initial volume. However, if a lapse in the conversation is detected, the volume of the next notification sound may once again be played at the initial volume or some volume that is distinguished from the subsequent volume. Thus, the instant message recipient may be alerted to the presence of a renewed conversation or other event.

Upon the receipt of an initial event notification, such as the receipt of an initial instant message in an IM conversation, an audible alert is played at the initial (e.g., full) volume. Subsequent event notifications, such as the receipt of subsequent instant messages received from the same instant message sender during the instant messaging session, are played at a subsequent volume that is a reduced volume relative to the initial volume. For example, subsequent messages may be played at 25% of the initial volume. Alternatively, subsequent messages may be muted. In one implementation, the user may select the volume level of the initial alert and/or the subsequent audible alerts.

If a lapse in the instant messaging conversation is detected, or if the conversation window is closed and a new conversation begins in a new window, the volume of the next notification sound may be played at a lapse volume, which may be the initial volume or another volume that is distinguished from the subsequent (e.g., reduced) volume. For example, if a pre-determined amount of time passes without the sending or receipt of an instant message or user interaction with a received request, the conversation may be deemed to have lapsed. The user may select the time for a lapse to be declared, or a time such as, for example, 5 minutes, may be pre-selected for determining if a lapse has occurred. In another example, a lapse may also be declared if the number of outgoing and/or incoming messages per unit time falls below a threshold number.

Once an instant messaging conversation has begun, it may be assumed that the user is paying attention to the instant messaging conversation and therefore the volume of the subsequent audible alerts may be reduced. If, however, a lapse is detected in the conversation, the next instant message received from the instant messaging sender will once again be played at the initial volume, or a volume different from the reduced volume, because it may no longer be reasonable to assume that the user is paying attention to the instant messaging conversation. Thereinafter, as previously described, subsequent audible alerts will be played at a subsequent volume, such as a reduced volume. Once an instant messaging session is closed with respect to an instant message sender, the next new instant messaging from the same instant messaging sender will once again be played at the initial volume, and the process of sound volume reduction will start again.

The sound control feature may be used in other contexts. For example, the sound control feature may be used in a mobile device such as a cellular phone. Also, if the sound associated with the initial message differs from the sound associated with a subsequent message, the sound associated with the initial message may be played upon receipt of a message after a lapse is detected. Where the sounds associated with a subsequent message differs from the sound associated with an initial message, the volume of the sound associated with the first message may or may not differ from the volume of the sound associated with the subsequent message.

For illustrative purposes, FIGS. 1, 2A, 2B, 3A and 3B show examples of communications systems for implementing techniques for transferring electronic data.

Referring to FIG. 1, a communications system 100 is capable of delivering and exchanging data between a client system 105 and a host system 110, such as an IM host system, through a communications link 115. The client system 105 may include a first user system 105A and a second user system 105B. The first user system 105A and the second user system 105B include communication software to enable users of these client systems to access the host system 110. Such a communications system 100 may be available to users of IM service providers, such as, for example, AIM, ICQ, Yahoo Messenger, and Microsoft Messenger.

The host system 110 may support IM services irrespective of a user's network or Internet access. Thus, the host system 110 may allow users to send and receive IMs, regardless of whether they have access to any particular ISP. The host system 110 also may support associated services, such as administrative matters, advertising, directory services, chat, and interest groups related to the IM. The host system 110 has an architecture that enables the devices (e.g., servers) within the host system 110 to communicate with each other. To transfer data, the host system 110 employs one or more standard or exclusive IM protocols.

To access the host system 110 to begin an IM session in the implementation of FIG. 1, the first user system 105A establishes a connection to the host system 110. Once a connection to the host system 110 has been established, the first user system 105A may directly or indirectly transmit data to and access content from the host system 110. By accessing the host system, a first user can use the IM client application to view whether particular users ("buddies") are on-line, exchange IMs with particular buddies, participate in group chat rooms, trade files such as pictures, invitations or documents, find other buddies with similar interests, get customized information such as news and stock quotes, and search the Web. Second user system 105B may be similarly manipulated to establish contemporaneous connection with host system 110.

Once connectivity is established, a first user who is using first user system 105A views whether a second user using second user system 105B is on-line and able to receive IMs. If the second user is on-line, the first user may exchange IMs with the second user.

In one implementation, the IMs sent between first user system 105A and second user system 105B are routed through host system 110. In another implementation, the IMs sent between first user system 105A and second user system 105B are routed through a third party server (not shown), and, in some cases, also are routed through host system 110. In yet another implementation, the IMs are sent directly between first user system 105A and second user system 105B.

Figure 2A:
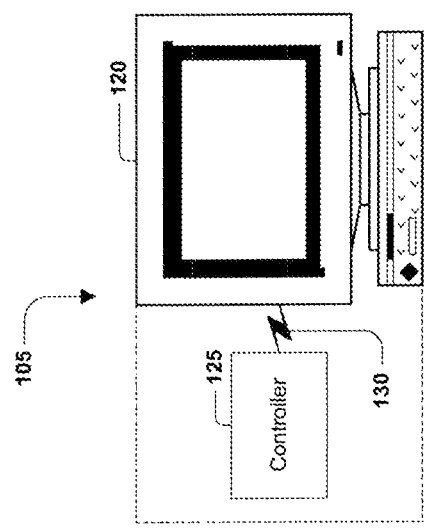

Referring to FIGS. 2A and 3A, the client system 105, such as first user system 105A and/or second user system 105B, typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 and the host device 135 generally are capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145, which are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

FIG. 2B illustrates a communications system 200B including a client system 105, such as first user system 105A and/or second user system 105B, communicating with a host system 110 through a communications link 115. The client system 105 includes a client device 120 that typically includes a general-purpose computer 270 having an internal or external memory 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., America Online (AOL) client, CompuServe client, AOL Instant Messenger (AIM) client, an interactive television (ITV) client, an internet service provider (ISP) client, or an instant messaging (IM) client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and other content formatted according to standard protocols such as the Hypertext Transfer Protocol (HTTP).

The communications link 115 typically includes a delivery network 160 that provides direct or indirect communication between the client system 105 and the host system 110, irrespective of physical separation. Examples of a delivery network 160 include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

Several communications applications and protocols, such as instant messaging or chat, may be used by communications system 200. Typically, instant messaging (IM) communications involve an instantaneous or nearly instantaneous communication between two users, where each user is able to transmit, receive and display communicated information. Additionally, IM communications involve the display and perception of on-line presence information regarding other selected users ("buddies"). The IM communications may be machine-to-machine communications that occur without intervention by or communication through an instant messaging server after a communication session is established or authentication is performed. Examples of IM communications exist over AIM (America Online Instant Messenger), AOL (America Online) Buddy List and Instant Messages, Yahoo Messenger, MSN Messenger, and ICQ, among others. Although some examples of sharing on-line media experiences are discussed below using IM applications, other implementations provide similar functionality in platforms and on-line applications such as chat.

Chat communications typically involve an instantaneous or nearly instantaneous communication between two or more users in a "chat room," where each user is able to transmit, receive and display communicated information. Additionally, chat communications may involve the display and perception of on-line presence information regarding other selected participants in the chat room. However, chat communications may occur in the absence of on-line presence information. The chat communications may be machine-to-machine communications that occur without intervention by or communication through a chat server after a communication session is established or authentication is performed. Examples of chat communications exist over AOL (America Online) and CompuServe, among others.

One or more of the application programs may be installed on the internal or external storage 272 of the general-purpose computer 270. Alternatively, in another implementation, the client controller 125 may access application programs externally stored in and/or performed by one or more device(s) external to the general-purpose computer 270.

The general-purpose computer 270 also includes a central processing unit 282 (CPU) for executing instructions in response to commands from the client controller 125, and a communication device 284 for sending and receiving data. One example of the communication device 284 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 270 optionally includes a television ("TV") tuner 286 for receiving television programming in the form of broadcast, satellite, and/or cable TV signals. The TV tuner 286 permits the client device 120 to selectively and/or simultaneously display network content received by communications device 284 and TV programming content received by the TV tuner 286.

The general-purpose computer 270 may include an input/output interface 288 that enables wired or wireless connection to various peripheral devices 290. Examples of peripheral devices 290 include, but are not limited to, a mouse 291, a mobile phone 292, a personal digital assistant (PDA) 293, an MP3 player (not shown), a keyboard 294, a display monitor 295 with or without a touch screen input, a TV remote control 296 for receiving information from and rendering information to users, an audio output device 297 such as a speaker, and an audiovisual input device 298.

Although FIG. 2B illustrates devices such as a mobile telephone 292, a PDA 293, and a TV remote control 296 as being peripheral with respect to the general-purpose computer 270, other implementations may have such devices themselves include the functionality of the general-purpose computer 270 and operate as the client device 120. For example, the mobile phone 292 or the PDA 293 may include computing and networking capabilities and may function as a client device 120 by accessing the delivery network 160 and communicating with the host system 110. Furthermore, the client system 105 may include one, some or all of the components and devices described above.

Figure 3B:
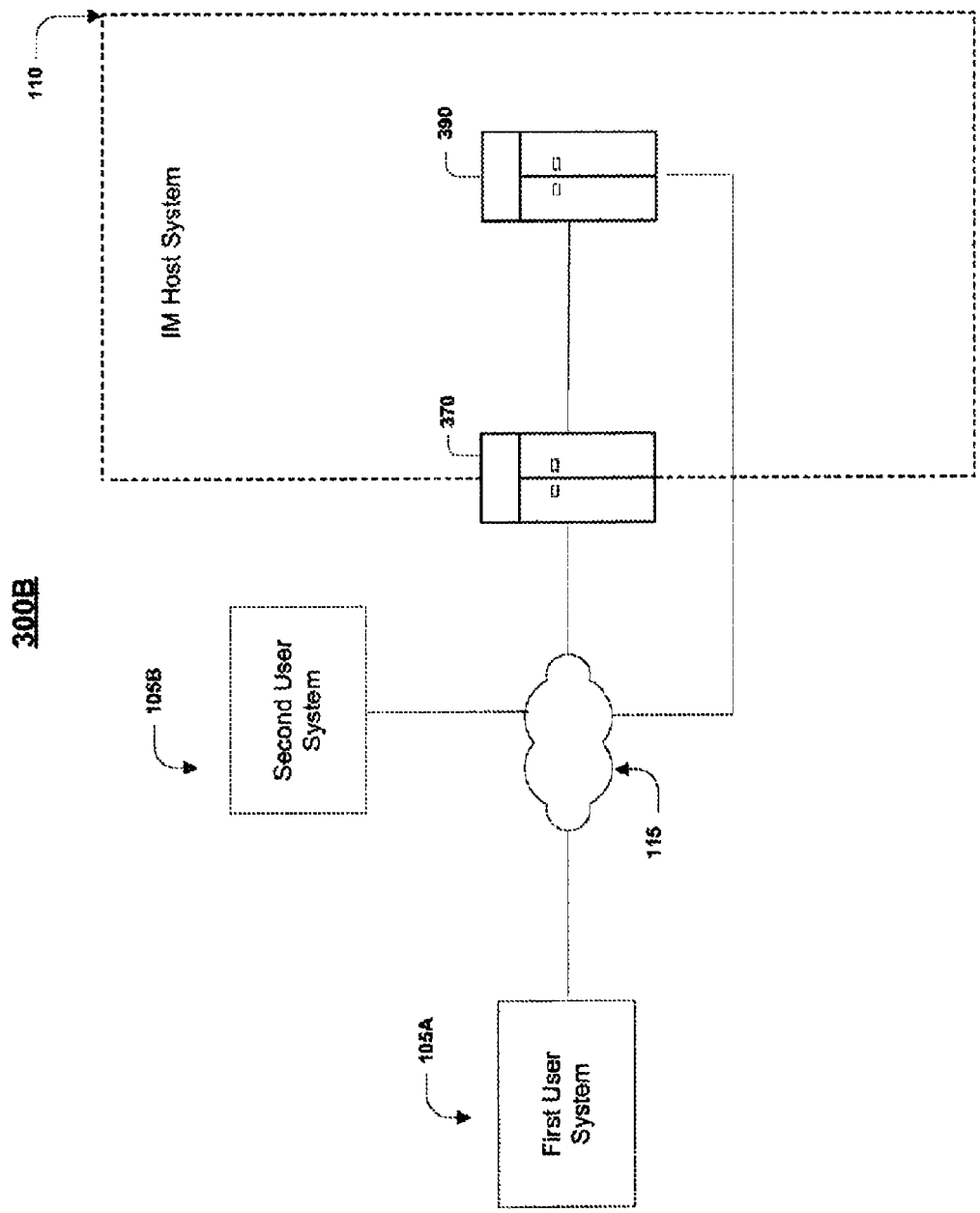

FIG. 3B illustrates a communications system 300B including a first user system 105A communicating with a second user system 105B and host system 110 through a communication link 115. System 300B illustrates a possible implementation of the communications system 100 of FIG. 1.

In system 300B, the host system 110 includes a login server 370 for enabling access by users and routing communications between the first user system 105A, the second user system 105B, and the host system 110. The host system 110 also includes an IM server 390. To enable access to and facilitate interactions with the host system 110, the first user system 105A and the second user system 105B may include communication software, such as, for example, an OSP client application and/or an IM client application.

As described with respect to FIG. 1, the host system 110 may support IM services irrespective of a first user's network or Internet access. Thus, the host system 110 may allow users to send and receive IMs regardless of whether they have access to any particular ISP. The host system 110 also may support associated services, such as administrative matters, advertising, directory services, chat, and interest groups related to the IM. The host system 110 has an architecture that enables the devices (e.g., servers) within the host system 110 to communicate with each other. To transfer data, the host system 110 employs one or more standard or exclusive IM protocols.

The first user system 105A may establish a connection to the login server 370 in order to access the host system 110 and begin an IM session. The login server 370 typically determines whether the particular first user is authorized to access the host system 110 by verifying the first user's identification and password. If the first user is authorized to access the host system 110, the login server 370 usually employs a hashing technique on the first user's screen name to identify a particular IM server 390 within the host system 110 for use during the first user's session. The login server 370 provides the first user system 105A with the IP address of the IM server 390, gives the first user system 105A an encrypted key, and breaks the connection. The first user system 105A then uses the IP address to establish a connection to the particular IM server 390 through the communications link 115, and uses the encrypted key to obtain access to the IM server 390. Typically, the first user system 105A is able to establish an open TCP connection to the IM server 390. The second user system 105B establishes a connection to the host system 110 in a similar manner.

In one implementation, the first user system 105A may directly or indirectly transmit data to and access content from the IM server 390 once a connection to the IM server 390 has been established. By accessing the IM server, a first user can leverage the IM client application to determine whether particular users ("buddies" or potential second users) are on-line, exchange IMs with particular buddies, participate in group chat rooms, trade files such as pictures, invitations or documents, find other buddies with similar interests, get customized news and stock quotes, and search the Web. For example, a first user who is using first user system 105A may view whether a buddy using second user system 105B is on-line, and if so, may exchange IMs with that buddy.

The IMs sent between first user system 105A and second user system 105B may be routed through host system 110, routed through a third party server (not shown, or the IMs may be sent directly between first user system 105A and second user system 105B.

The host system 110 may include a user profile server (not shown) connected to a database (not shown) for storing large amounts of user profile data. The user profile server may be used to enter, retrieve, edit, manipulate, or otherwise process user profile data. In one implementation, a user's profile data includes, for example, the user's screen name, buddy list, geographic location, and identified interests, including interests in various categories of on-line media. The first user or the second user may enter, edit and/or delete profile data using an installed IM client application on the first user system 105A or on the second user system 105B to interact with the user profile server.

Because the user's data are stored in the host system 110, the first user and the second user do not have to reenter or update such information in the event that the first user or the second user accesses the host system 110 using a new or different first user system 105A or second user system 105B. Accordingly, when, for example, the first user accesses the host system 110, the IM server 390 can instruct the user profile server to retrieve the first user's profile data from the database and to provide, for example, the first user's buddy list to the IM server 390. Alternatively, user profile data may be saved locally on the first user system 105A.

Systems similar to those shown by FIGS. 1 and 3B may be used to enable similar functionality with respect to non-IM communications schemes, for example, such as the types described with respect to FIG. 2B.

Figure 4:
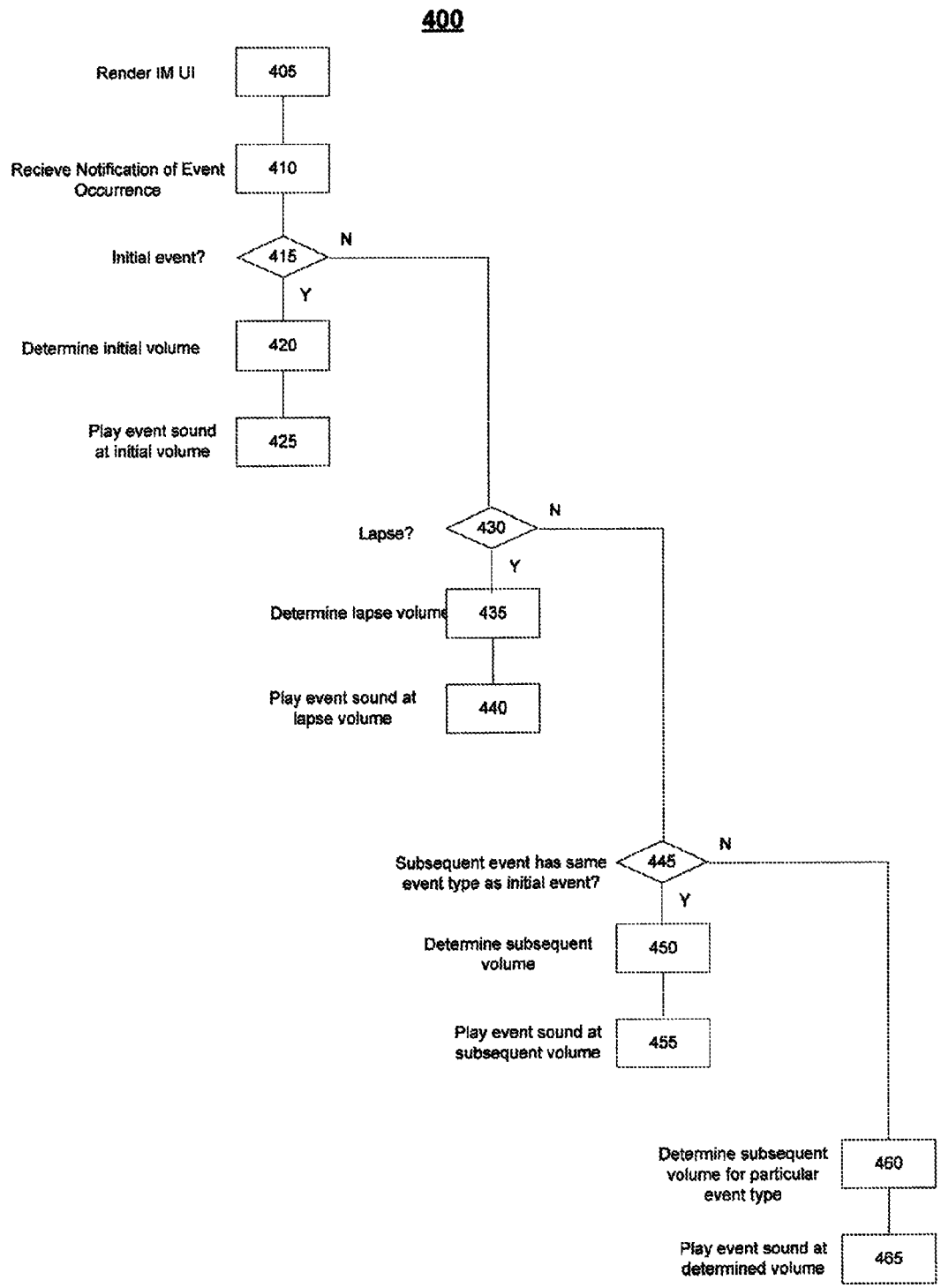
FIG. 4 is a flow chart of an exemplary process that may be implemented by systems such as those of FIGS. 1, 2A, 2B, 3A and 3B.

Referring to FIG. 4, the first user system 105A, the second user system 105B, and the host system 110 interact according to exemplary procedure 400 to control the volume of sound in response to events in an instant messaging conversation. An event may be, for example, the receipt of an instant message, the sending of an instant message, the receipt of a notification that another user is typing a message or entering text in an instant messaging communications session with the first user, or the receipt of a notification of an online presence state change for another user on the first user's buddy list.

The procedure 400 may be implemented by various types of hardware, software, device, computer, computer system, equipment, component, program, application, code, storage medium, or propagated signal. Furthermore, although not shown in FIG. 4, the first user system 105A, the second user system 105B, and the host system 110 may be directly or indirectly interconnected through known or described delivery networks, examples of which are described with respect to network 160. The procedure 400 may be implemented in a client/host context, or a standalone or offline client context. The sound volume may be controlled by the standalone/offline device and the control parameters for the sound control may be accessed or updated through a remote device in a non-client/host environment, such as, for example, a LAN server serving an end user or a mainframe serving a terminal device. Thus, the procedure 400 described below may be implemented for an OSP, ISP, browser and/or other software program, such as communications programs including programs for instant messaging and chat.

Procedure 400 generally involves controlling the volume of instant messaging sounds of a first instant messaging user in an instant messaging communication session with a second instant messaging user. While some functions of procedure 400 may be performed entirely by the first user system 105A or the second user system 105B, other functions may be performed by the host system 110 or the collective operation of the first user system 105A, the second user system 105B, and/or the host system 110. The host system may be, for example, an IM host system or a different host system.

In the procedure 400, an instant messaging user interface (UI) is rendered to a first instant messaging user on a first instant messaging user system (step 405).

The first user system receives a notification of an event occurrence (step 410). The first user system may receive the notification from the host system 110 or a different host system or client system. In one implementation, the first user system detects the occurrence of the event. The event may be associated with an event type such as, for example, an event type indicating the receipt of an instant message or an event type indicating the receipt of a notification of an online presence state change for a different user on the first user's buddy list.

Next, a determination is made as to whether the event is an initial event (step 415). Various criteria may be used to determine whether the event is an initial event. For example, the criteria may include the absence of a window or session involving the second instant messaging user. In another implementation, an event log may be maintained by the user system or by the host system to record various events related to a communications session. The event log may be consulted for determining whether the event is an initial event.

If the event is determined to be an initial event, then an initial volume is determined (step 420). The initial volume may be determined automatically, or the initial volume may be determined manually through user input. For example, the initial volume may be determined through manipulation of a UI, such as UI 500 described below with respect to FIG. 5. In another implementation, the initial volume may be pre-determined without user input. The initial volume may be full volume, or a different volume chosen by the user.

The sound corresponding to the event is then played at the initial volume (step 425). For example, referring to FIG. 2, the instant messaging application, as a client application 278, may send a volume control signal to the operating system 274, which controls the input/output interface 288 (e.g., a sound card), which in turn controls the volume of audio output device 297. The sound corresponding to the event may be user-selected, or may be pre-selected for the user. The sound may be an audible alert that serves as a user identifier for the sender of an instant message or the initiator of the event. A single user identifier may be used to signal an initial message from or to a particular user, subsequent messages from or to a particular user, or other events related to that user, but the volume of the audible alert differs based upon its characteristic as an initial or a subsequent message or other event.

If the event is not determined to be an initial event, then the event is a subsequent event and a determination will be made as to whether the conversation has lapsed (step 430). A lapse may be declared, for example, if a pre-determined amount of time passes without the sending or receipt of an instant message or if the number of outgoing and/or incoming messages per unit time falls below a threshold number. It is possible to time the delay between a previous communication from a user or other event, such as the user typing or input of a message, and a current communication from a user or other event, such as user typing or input of a message. The time delay may be used in determining whether a lapse condition has occurred. A lapse may also be declared if the conversation window is closed and a new conversation begins in a new window. Other criteria may be used for determining whether the conversation has lapsed. For example, a lapse may be declared by determining whether an IM window containing a communications session between participants in the IM conversation has been closed or minimized, determining whether one of the participants in the IM conversation has logged out or has an indication of an idle or unavailable state. It is possible to monitor not only the existence of an IM communications session between participants, including a message string, but also user activity such as typing or entering text before sending an instant message in a particular IM communications session. The detected activity in the IM communications session may be used as a basis for determining whether a lapse has occurred in the conversation and/or as a basis for adjusting the volume level.

The user may define the criteria for a lapse through manipulation of a UI, such as UI 500 discussed below with respect to FIG. 5. In another implementation, the criteria for a lapse may be pre-defined without user input.

If a lapse is determined to exist, then a lapse volume is determined (step 435). The lapse volume may be determined automatically, or may be determined manually through user input. For example, the lapse volume may be determined through manipulation of a UI, such as UI 500 described below with respect to FIG. 5. In another implementation, the lapse volume may be pre-determined without user input. The lapse volume may be the same as the initial volume, or may differ from the initial volume and also may differ from a subsequent volume associated with subsequent events, as discussed below with respect to steps 445-465. The lapse volume may be, for example, full volume, or a different volume chosen by the user.

The sound corresponding to the event is then played at the lapse volume (step 440). For example, referring to FIG. 2, the instant messaging application, as a client application 278, may send a volume control signal to the operating system 274, which controls the input/output interface 288 (e.g., a sound card), which in turn controls the volume of audio output device 297.

If a lapse is determined not to exist, then a determination is made as to whether the event has the same event type as the initial event (step 445). If the event has the same event type as the initial event, then a subsequent volume is determined (step 450). The subsequent volume may be determined automatically, or may be determined manually through user input. For example, the subsequent volume may be determined through manipulation of a UI, such as UI 500 described below with respect to FIG. 5. In another implementation, the subsequent volume may be pre-determined without user input. The subsequent volume differs from the initial volume, and may be full volume, or a different volume chosen by the user.

The sound corresponding to the event is then played at the subsequent volume (step 455). For example, referring to FIG. 2, the instant messaging application, as a client application 278, may send a volume control signal to the operating system 274, which controls the input/output interface 288 (e.g., a sound card), which in turn controls the volume of audio output device 297.

If the event does not have the same event type as the initial event, then a subsequent volume is determined for the particular event type corresponding to the subsequent event (step 460). The subsequent volume may be determined automatically for the particular event type, or may be determined manually through user input. For example, the subsequent volume may be determined through manipulation of a UI, such as UI 500 described below with respect to FIG. 5. In another implementation, the subsequent volume may be pre-determined without user input. The subsequent volume for the particular event type typically differs from the initial volume of the event type corresponding to the initial event, and may differ from the subsequent volume for events having the same event type as the initial event as discussed above with respect to step 450. However the subsequent volume for the particular event type may be the same as the initial volume, and may be full volume, or a different volume chosen by the user.

The sound corresponding to the particular event type is then played at the subsequent volume (step 465). For example, referring to FIG. 2, the instant messaging application, as a client application 278, may send a volume control signal to the operating system 274, which controls the input/output interface 288 (e.g., a sound card), which in turn controls the volume of audio output device 297.

In one example of procedure 400, a second instant messaging user sends a first instant message to a first instant messaging user. The first instant messaging user is using a first instant messaging user system. The first instant messaging user system renders an IM UI to the first instant messaging user (step 405). The first instant messaging user system receives notification of the event of the incoming first instant message (step 410). A determination is made as to whether this message is an initial instant message from the second user (step 415). For example, a determination may be made as to whether a communications window for an IM conversation between the first user and the second user is currently open in order to determine whether the message is an initial message. If the message is determined to be an initial message, then the initial volume is determined (step 420). The determination may be made, for example, by the first instant messaging user system or by a host system. In this example, the message is determined to be an initial message, the initial volume is full volume, and the sound corresponding to the receipt of the initial instant message is then played at full volume (step 425).

Continuing with the example of procedure 400, a second message is received by the first instant messaging user from the second instant messaging user ten minutes after the receipt of the initial message, and the first instant messaging user system is notified of the occurrence of this new event (step 410). A determination is made as to whether the receipt of the second message is an initial event (step 415). In this example, the determination is made that the receipt of the second message is not an initial event.

Next, a determination is made as to whether a lapse condition has occurred (step 430). For example, the amount of time passing between the initial message and the second message may be calculated and computed against a threshold value of time, such as five minutes. Other conditions may be tested to determine whether a lapse condition has occurred. For example, a determination may be made as to whether the first instant messaging user has closed or minimized the window containing the instant messaging conversation with the second instant messaging user. In this example, a lapse condition has occurred because there has been a passage of more than five minutes between the initial and the second message. A lapse volume is determined (step 435), which in this case is the initial volume, and the sound corresponding to the receipt of the second message is played at the lapse volume (step 440). Because a lapse condition has occurred, the second event may be treated as an initial event with respect to events occurring subsequent to the second event, and the sound played for the second message may be a sound corresponding to an initial event. The second event resets the determination of an initial event occurrence and is treated as an initial event because it was determined that a lapse occurred.

Continuing the example of procedure 400, a third message is received by the first instant messaging user from the second instant messaging user two minutes after the receipt of the second message, and the first instant messaging user system is notified of the occurrence of this new event (step 410). A determination is made as to whether the receipt of the third message is an initial event (step 415). In this example, the third message is determined not to be an initial event. Next, a determination is made as to whether a lapse condition has occurred (step 430). In this example, a lapse condition has not occurred with the third message because less than five minutes elapsed between receipt of the second and the third message.

Next, a determination is made as to whether the third message has the same event type as the initial event (step 445). In this example, receipt of the second message is being treated as the initial event due to the lapse occurring between the first message and the second message. Both the receipt of the third message and the receipt of the second message have the same event type, i.e., the event type of receipt of a new instant message from the second instant messaging user. In other implementations, a different definition of event type may be used and the event type may be found to differ. A subsequent volume is determined (step 450), which in this case is a volume reduced to 25% of the initial volume, and the sound corresponding to the receipt of the third message (i.e., a subsequent message) is played at the subsequent volume (step 455).

Further continuing the example of procedure 400, a new message is received by the first instant messaging user from a third instant messaging user two minutes after receipt of the third instant message from the second instant messaging user, and the first instant messaging user system is notified of the occurrence of this new event (step 410). A determination is made as to whether the receipt of the first message is an initial event (step 415). Although the message is an initial message from the third instant messaging user, it is not the initial instant message received by the first instant messaging user in this example. In one implementation, the new message may be treated as a subsequent event because the message is a subsequent instant message from an initial message, which is the case in the present example. In another implementation, the new message from the third instant messaging user may be treated as an initial event because it is the initial message from the third instant messaging user. Next, a determination is made as to whether a lapse condition has occurred (step 430). In this example, a lapse condition has not occurred with the new message because it was received less than five minutes after the receipt of the most recent other instant message (which in this example was the third message sent from the second instant messaging user in the IM communications session with the second instant messaging user).

Next, a determination is made as to whether the new message has the same event type as the initial event (step 445). Note that, in this example, receipt of the second message from the second instant messaging user is being treated as an initial event due to the lapse occurring between the first message and the second message from the second instant messaging user. In one implementation, which is the case in the present example, the receipt of the new message from the third instant messaging user may be considered to be a different event type than the receipt of the second message from the second instant messaging user. In another implementation, the receipt of the new message from the third instant messaging user and the receipt of the second message from the second instant messaging user may be considered to be the same type of event, i.e., receipt of a new instant message. A subsequent volume is determined (step 450) for the event type, which in this case is a volume reduced to 50% of the initial volume, and the sound corresponding to the receipt of the new message from the third instant messaging user is played at the subsequent volume (step 455).

The relative order of steps 405-466 with respect to other steps in procedure 400 may vary. For example, steps 430-440 may be performed after steps 445-465. Also, certain steps may be omitted entirely, as appropriate. For example, steps 445 and 460-465 may be omitted and a single subsequent volume determined without regard to whether the subsequent event is of the same or a different event type than the initial event. Also, step 415 may be omitted and a default volume level used until a subsequent event is detected. Various definitions and/or criteria for the determination of an initial event, a subsequent event, and an event type may be used.

Figure 5:
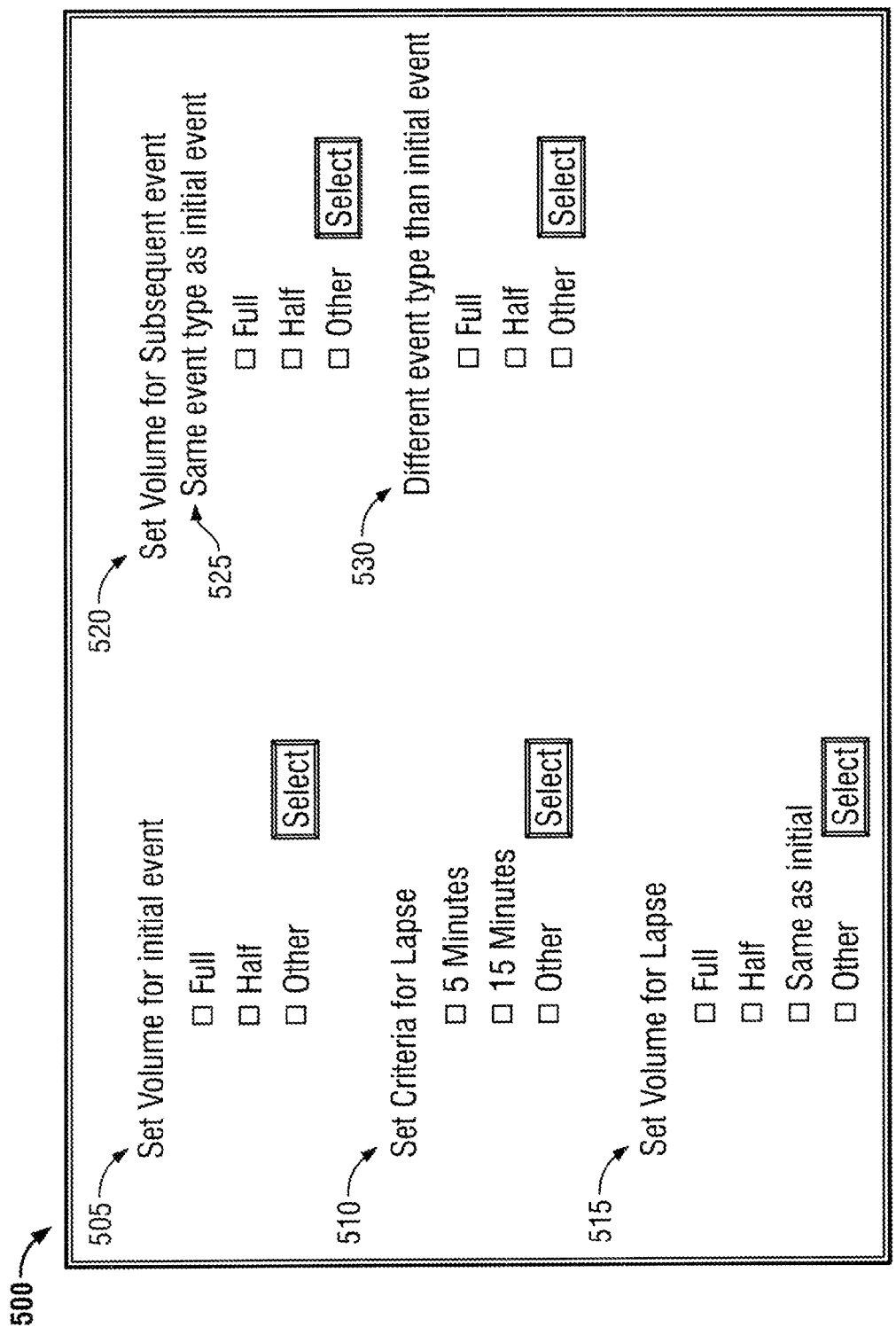
FIG. 5 is an illustration of a graphical user interface that may be implemented by systems such as those of FIGS. 1, 2A, 2B, 3A and 3B when executing a process such as that of FIG. 4.

FIG. 5 illustrates one example of a user interface (UI) 500 that may be presented to a first instant messaging user for enabling sound control. The UI 500 includes a set of controls 505 for controlling the volume of an initial event, as discussed above with respect to step 420 of procedure 400. As shown, the controls 505 enable the user to select the volume of the initial event to be full volume, half volume, or other volume selected by the user.

The UI 500 also includes a set of controls 510 for determining whether a lapse has occurred, as discussed above with respect to step 430 of procedure 400. As shown, the controls 510 enable the user to select the criteria for lapse to be a passage of 5 minutes, 15 minutes, or other user-selected period of time without messaging activity.

The UI 500 includes a set of controls 515 for controlling the lapse volume if a lapse condition occurs, as discussed above with respect to step 435 of procedure 400. As shown, the controls 515 enable the user to select the lapse volume to be full volume, half volume, the same volume as the initial volume, or other volume selected by the user.

The UI 500 also includes a set of controls 520 for controlling the volume of a subsequent event. The controls 520 include controls 525 for controlling the volume of a subsequent event of the same type as the initial event, as discussed above with respect to step 450 of procedure 400. As shown, the controls 525 enable the user to select the volume of the subsequent event to be full volume, half volume, or other volume selected by the user. The controls 520 also include controls 530 for controlling the volume of a subsequent event of a different type than the initial event, as discussed above with respect to step 460 of procedure 400. As shown, the controls 530 enable the user to select the volume of the subsequent event to be full volume, half volume, or other volume selected by the user.

There is particular and unique utility of the described sound control techniques in an instant messaging context, where messages between a sender and a recipient often occur with rapid succession. The pace of the instant messaging conversation may vary, with periods of very intense message activity and periods of very little message activity.

Other implementations are within the scope of the following claims. The described techniques may be applied in instant messaging communication contexts such as text messaging, video messaging, and audio messaging. The described techniques also may be applied to other communications contexts such as chat.

What is claimed is:

1. A method comprising:
receiving a first notification upon receipt of a first message;
providing a first alert at a first volume to indicate receipt of the first notification;
receiving a second notification upon receipt of a second message;
monitoring, using at least one processor, activity of a user, wherein the activity comprises one or more of typing, sending a message, or interacting with an application;
if the user has been active within a predetermined amount of time, providing a second alert at a second volume to indicate receipt of the second notification; and
if the user has been inactive during the predetermined amount of time, providing the second alert at the first volume to indicate receipt of the second notification.

2. The method as recited in claim 1, wherein the first message comprises a message from a first co-user.

3. The method as recited in claim 2, wherein the first message comprises an instant message.

4. The method as recited in claim 2, wherein the second message comprises a message from a second co-user.

5. The method as recited in claim 2, wherein the second message comprises an instant message.

6. The method as recited claim 2, wherein the second message comprises a message from the first co-user.

7. The method as recited in claim 1, wherein the first volume is louder than the second volume.

8. A non-transitory computer-readable storage medium including a set of instructions that, when executed, cause at least one processor to perform steps comprising:
receiving a first notification upon the receipt of a first message;
providing a first alert at the first volume to indicate receipt of the first notification;
receiving a second notification upon receipt of a second message;
monitoring activity of a user, wherein the activity comprises one or more of typing, sending a message, or interacting with an application;
if the user has been active within a predetermined amount of time, providing a second alert at a second volume to indicate receipt of the second notification; and
if the user has been inactive during the predetermined amount of time, providing the second alert at the first volume to indicate receipt of the second notification.

9. The non-transitory computer-readable storage medium as recited in claim 8, wherein the first volume is louder than the second volume.

10. The non-transitory computer-readable storage medium as recited in claim 9, wherein the first alert differs from the second alert.

11. The non-transitory computer-readable storage medium as recited in claim 10, wherein:
the first message comprises a first instant message; and
the second message comprises a second instant message received subsequent to the first instant message.

12. The non-transitory computer-readable storage medium as recited in claim 11, wherein the first message comprises a message from a first co-user.

13. The non-transitory computer-readable storage medium as recited in claim 11, wherein the second instant message comprises a message from the first co-user.

14. The non-transitory computer-readable storage medium as recited in claim 12, wherein monitoring activity of the user consists of monitoring typing by the user.

15. A method comprising:
providing, at a first client device, a first alert at a first volume to indicate receipt of, or sending of, a first electronic message;
receiving a notification of receipt of a second electronic message;
determining, using at least one processor, that a user has been active during a predetermined amount of time before receipt of the notification, wherein determining that the user has been active comprises one or more of determining that the user has typed, determining that the user sent a message, or determining that the user interacted with an application; and
based on the user being active during the predetermined amount of time, providing, at the first client device, a second alert at a second volume to indicate receipt of the notification.

16. The method as recited in claim 15, wherein the second volume is quieter the first volume.

17. The method as recited in claim 15, wherein the first electronic message comprises an instant message.

18. The method as recited in claim 15, wherein the first client device comprises a mobile device.

19. The method as recited in claim 18, wherein the first client device comprises a mobile phone.

20. The method as recited in claim 15, wherein the first and second electronic messages are from a first co-user of a communications system.

21. The method as recited in claim 1, wherein the predetermined amount of time comprises approximately five minutes.

22. The method as recited in claim 1, wherein determining that the user interacted with an application comprises determining that the user has minimized a conversation window.

23. The method as recited in claim 1, wherein determining that the user interacted with an application comprises determining that the user has opened the application.

24. The method as recited in claim 15, further comprising:
determining, using at the least one processor, that a user has been inactive during the predetermined amount of time before receipt of the notification; and
based on the user being inactive during the predetermined amount of time, providing, at the first client device, the second alert at the first volume.

* * * * *

UNITED STATES PATENT AND TRADEMARK OFFICE
CERTIFICATE OF CORRECTION

| | | |
|---|---|---|
| PATENT NO. | : 8,775,539 B2 | |
| APPLICATION NO. | : 13/620967 | |
| DATED | : July 8, 2014 | |
| INVENTOR(S) | : Brian D. Heikes et al. | |

It is certified that error appears in the above-identified patent and that said Letters Patent is hereby corrected as shown below:

In the claims

Column 16, line 34, please replace "is quieter the first volume," with --is quieter than the first volume--.

Column 16, line 48, please replace "in claim 1," with --in claim 15--.

Column 16, line 52, please replace "in claim 1," with --in claim 15--.

Signed and Sealed this
Twenty-ninth Day of December, 2015

Michelle K. Lee
*Director of the United States Patent and Trademark Office*